(12) United States Patent
Besold et al.

(10) Patent No.: US 9,338,236 B2
(45) Date of Patent: May 10, 2016

(54) COMPUTER-IMPLEMENTED METHOD FOR CHECKING A COMMUNICATION INPUT OF A PROGRAMMABLE LOGIC CONTROLLER OF AN AUTOMATION COMPONENT OF A PLANT

(71) Applicant: Siemens Aktiengesellschaft, Munich (DE)

(72) Inventors: Norbert Besold, Amberg (DE); Carl Kossack, Munich (DE); Wolfgang Schuierer, Schwandorf (DE)

(73) Assignee: Siemens Aktiengesellschaft, Munich (DE)

( * ) Notice: Subject to any disclaimer, the term of this patent is extended or adjusted under 35 U.S.C. 154(b) by 278 days.

(21) Appl. No.: 13/644,424

(22) Filed: Oct. 4, 2012

(65) Prior Publication Data

US 2013/0086244 A1 Apr. 4, 2013

(30) Foreign Application Priority Data

Oct. 4, 2011 (EP) .................................... 11183786

(51) Int. Cl.
*G06F 15/173* (2006.01)
*H04L 29/08* (2006.01)
*H04L 29/06* (2006.01)

(52) U.S. Cl.
CPC ............ *H04L 67/12* (2013.01); *H04L 63/0227* (2013.01); *H04L 67/34* (2013.01)

(58) Field of Classification Search
None
See application file for complete search history.

(56) References Cited

U.S. PATENT DOCUMENTS

| 6,763,469 | B1 | 7/2004 | Daniely | |
|---|---|---|---|---|
| 8,042,147 | B2* | 10/2011 | Byres et al. | ....................... 726/1 |
| 2002/0162026 | A1 | 10/2002 | Neuman et al. | |
| 2005/0021839 | A1 | 1/2005 | Russell et al. | |
| 2005/0235360 | A1* | 10/2005 | Pearson | ......................... 726/23 |
| 2006/0085839 | A1 | 4/2006 | Brandt et al. | |
| 2006/0224254 | A1* | 10/2006 | Rumi et al. | ................... 700/28 |
| 2010/0042689 | A1 | 2/2010 | Doggett | |
| 2011/0282508 | A1* | 11/2011 | Goutard et al. | ............... 700/293 |

* cited by examiner

*Primary Examiner* — Chris Parry
*Assistant Examiner* — Stephen Houlihan
(74) *Attorney, Agent, or Firm* — Cozen O'Connor

(57) ABSTRACT

In order to determine for a programmable logic controller whether or not a communication input is blocked, a nominal/actual comparison between the communication input and predefined rules of a nominal communication is performed, a reaction matrix being used for case differentiation.

18 Claims, 4 Drawing Sheets

COMPUTER-IMPLEMENTED METHOD FOR CHECKING A COMMUNICATION INPUT OF A PROGRAMMABLE LOGIC CONTROLLER OF AN AUTOMATION COMPONENT OF A PLANT

BACKGROUND OF THE INVENTION

1. Field of the Invention

The invention relates to a computer-implemented method for checking a communication input of a programmable logic controller of an automation component of a plant, a checking device for checking the communication input of the programmable logic controller of the automation component of the plant, an automation network for controlling and checking the communication of an input interface of the programmable logic controller of the automation component of the plant, a configuration server for configuring, controlling and monitoring the checking device, and a computer program product.

2. Description of the Related Art

Hitherto, only whole production cells, i.e., sub-networks of an automation network of a factory automation system, have been protectable by external firewalls against "unauthorized" communication inputs, i.e., computer viruses, data espionage attempts, data manipulation attempts or mis-addressings, from a network upstream of the sub-network. In accordance with the current prior art, there is as yet no decentralized filtering functionality located directly at the input interface of each programmable logic controller of an automation component to provide protection against "unauthorized" communication inputs for attempted data manipulation and/or data espionage. Consequently, there still exists a certain security vulnerability in terms of local protection of an individual programmable logic controller of an automation component within an automation network. Consequently, there is also still no effective protection against negative interaction of individual inter-communicating automation components within a production cell of an automation system.

SUMMARY OF THE INVENTION

In view of the foregoing, it is an object of the invention to create an improved computer-implemented method for checking a communication input of a programmable logic controller of an automation component of a plant, an improved checking device for checking the communication input of the programmable logic controller of the automation component of a plant, an improved automation network for controlling and checking the communication of an input interface of the programmable logic controller of the automation component of the plant, a configuration server for configuring, controlling and monitoring the checking device, and an improved computer program product.

These and other objects and advantages are achieved in accordance with the invention by a computer-implemented method for checking a communication input of a programmable logic controller of an automation component of a plant, wherein the checking method occurs immediately upstream of an input interface of the programmable logic controller and comprises performing a nominal/actual comparison between a communication input and predefined rules of a nominal communication, in the event that the communication input complies with at least one predefined rule of the nominal communication, forwarding the communication input directly to the input interface of the programmable logic controller, in the event that the communication input does not comply with at least one predefined rule, forwarding the communication input to a processor device in which internal statistics of all nominal/actual deviations are first updated and then deciding by a predefined reaction matrix whether the respective communication input shall result in a predefined active warning being issued, and in the event that the communication input does not comply with at least one predefined rule, forwarding the communication input by the processor device to a gate upstream of the input interface of the programmable logic controller, in which gate it is determined, depending on the reaction matrix, whether or not the communication input will be blocked.

This can be advantageous in that, by inserting a filtering functionality directly upstream of the input interface of a programmable logic controller of an automation component, e.g., a data manipulation or espionage attempt launched inside a sub-network of an automation network and bypassing a firewall provided upstream of the sub-network, can be averted locally at the individual automation component itself, immediately upstream of the input interface of its programmable logic controller.

Due to the fact that a nominal/actual comparison between the incoming communication input and predefined rules of a nominal communication is performed locally at each programmable logic controller, individual rules for the nominal communication can be defined for each programmable logic controller. The local filters for network communication therefore allow a higher degree of differentiation between an "authorized" and an "unauthorized" communication. At the same time, the degree of scalability of a sub-network of an automation network is increased.

Due to the fact that only updating of internal statistics of all the actual deviations occurs in a processor device and no log files are stored locally, less memory space is required. At the same time, account is taken of the fact that programmable logic controllers of automation components, because of a continuous production process, are mostly active and therefore evaluation of local log files would be inefficient.

As the result of a predefined reaction matrix being applied locally at each programmable logic controller, by which a decision is made as to whether a warning is issued by the processor device and an information message and/or a communication input is forwarded on to the gate where it is in turn decided by the reaction matrix whether or not to block the communication input. The reaction matrix can also be individualized for each programmable logic controller, thereby enabling the degree of differentiation of the reactions of a plurality of grouped programmable logic controllers to be increased. Individualizing the reaction matrix of a programmable logic controller within a sub-network therefore also enables the automation components to be protected from negative effects of the automation components present in the sub-network.

As a result of the reaction matrix which decides whether or not to block a communication input likewise being applied locally in the gate upstream of an input interface, the rules for blocking a communication input can be also be individualized here. As a result, a decision can be made locally in a differentiated manner at the input interface of a programmable logic controller of an automation component as to the automation component from which another automation component receives a communication input, thereby preventing mis-addressings and negative interaction of automation components. In addition, to prevent a communication load, irrelevant and redundant communication inputs can be filtered locally upstream of each input interface of a programmable logic controller by blocking them in the local gate, where the communication capacity of each individual programmable logic controller of an automation system can be taken into account.

The filtering mechanism with checking of the locally incoming communication inputs and which is positioned locally at each programmable logic controller of an automation component of a factory automation system therefore provides security-oriented segmentation of the automation network to the highest possible granularity level.

A programmable logic controller (PLC) is a device that is used for "open-loop" or "closed-loop control" of a machine or plant and is programmed digitally.

An automation network can be implemented, e.g., as an industrial automation network. Such industrial automation networks can be designed, set up and/or provided, e.g., for open-loop and/or closed-loop control of industrial plant (e.g., production facilities or conveying systems), machinery and/or equipment. In particular, automation networks or more specifically industrial automation networks can have real-time communication protocols (e.g., Profinet, Profibus, real-time Ethernet) for communication at least between the components involved in open-loop and/or closed-loop control tasks (e.g., between the control units and the plant and/or machinery to be controlled). The secure transmission of data via storage media is likewise covered.

In addition, however, aside from a real-time communication protocol, at least one other communication protocol (which e.g., does not need to have real-time capability) may also be provided in the automation network or more specifically industrial automation network, e.g., for monitoring, setting up, reprogramming and/or reparameterizing one or more control units in the automation network.

An automation network may comprise, e.g., wireline communications components and/or wireless communications components. In addition, an automation network may comprise at least one automation device.

An automation device can be, for example, a computer, PC and/or controller with control functions or rather control capabilities. In particular, an automation device can be, for example, an industrial automation device which may be designed, set up and/or provided, e.g., specifically for open-loop and/or closed-loop control of industrial plant. In particular, such automation devices or more specifically industrial automation devices may have real-time capability, i.e., allow open- or closed-loop control in real time. For this purpose, the automation device or more specifically the industrial automation device may incorporate, e.g., a real-time operating system and/or support among other things at least one real-time-capable communication protocol for communication (e.g., Profinet, Profibus, real-time Ethernet).

An automation network comprises a plurality of sensors and actuators. The actuators and sensors are controlled by at least one control device. The actuators, the sensors and the at least one control device exchange data with one another. An automation protocol is used for data interchange. The at least one control device controls the actuators, the sensors and the data interchange such that an automated manufacturing process occurs in which, e.g. a product is manufactured.

An industrial automation device can be or can comprise, e.g., a programmable logic controller, a module or part of a programmable logic controller, a programmable logic controller incorporated in a computer or PC as well as corresponding field devices, sensors and/or actuators, input and/or output devices or similar for connection to a programmable logic controller.

In the context of the present invention, an automation protocol is to be understood as meaning any kind of protocol that is provided, suitable and/or set up for communication with automation devices as described here. Such automation protocols can be, for example, the Profibus protocol (e.g., per International Electrotechnical Commissioner (IEC) Standard 61158), a Profibus DP protocol, a Profibus PA protocol, a Profinet protocol, a Profinet IO protocol, an AS-Interface protocol, an IO-Link protocol, a KNX protocol, a protocol according to a multipoint interface (MPI), a protocol for a point-to-point connection (PtP), a protocol in accordance with the specifications of S7 communication (which is provided and set up, for example, for communication of Siemens programmable logic controllers) or also an Industrial Ethernet protocol or real-time Ethernet protocol or rather other specific protocols for communication with automation devices. Any combinations of the above protocols can also be envisaged as an automation protocol within the meaning of this description.

In accordance with an embodiment of the invention, the rules of the nominal communication are created by a learning mode, where upon activation of the learning mode the programmable logic controller stores a communication input profile, manual configuration, or by a central server distributing a communication input profile to the programmable logic controllers.

The fact that different possibilities exist for creating the rules of the nominal communication advantageously allows the given system environment of a plant and also specific situations to be taken into account.

For example, if a central configuration server fails, or if no such server is present in the automation network, the rules of the nominal communication can be configured manually.

If a central configuration server is again present in the automation network, the rules of the nominal communication can be defined centrally on the configuration server and from there distributed system-wide to the respective programmable logic controllers in the form of a communication input profile, thereby significantly reducing the administration overhead.

The fact that the rules of the nominal communication have a learning mode can be advantageous in that, after a learning phase, a programmable logic controller automatically recognizes the other programmable logic controller[s] involved in the automation network. Thus the programmable logic controllers involved do not need to be reconfigured. If the plant is enlarged, no new configuration of the participating programmable logic controllers is necessary, which considerably reduces the administration overhead.

In accordance with an embodiment of the invention, the reaction matrix has control features for controlling processes in the processor device and/or in the gate, where based on the control features a decision is made as to how the statistics of all the nominal/actual deviations is to be updated, whether a warning comprising an information message is to be issued, and in the event that a warning is to be issued, what form the information message is to take, which information message is to be transmitted, the address to which the information message is to be sent, and/or whether or not the communication input is to be blocked in the gate.

The reaction matrix can therefore be used for controlling three different kinds of security reactions: issuing warnings, sending information messages using different media and/or blocking a communication input.

This can have the advantage that by, e.g., centrally configuring a reaction matrix, security measures can be taken at different levels, and therefore the different phases and elements of incident and/or event management can be fulfilled by a significantly reduced administration overhead. Each of the steps of a classification of warning levels, logging of events, updating of statistics of the nominal/actual deviations with the possibility of evaluation, reporting to different addresses and taking a concrete countermeasure can be defined without great complexity by configuring a reaction matrix.

In accordance with another embodiment of the invention, the reaction matrix is input directly as a stand-alone configuration during configuring of the programmable logic controller and/or transmitted as a profile from a centrally configured configuration server.

Depending on the given conditions of an automation network, the reaction matrix of a programmable logic controller can be administered locally as a stand-alone configuration during individual configuring of a programmable logic controller, but also, if a central configuration server is present, defined centrally during configuration of the configuration server and transmitted from there via the network as a communication profile to the processor device and/or to the gate of the local filtering device of a programmable logic controller. This shows flexibility in administering the reaction matrix, with the ability to adapt to the respective system landscape and the respective situation.

While central configuration of the reaction matrix has advantages in terms of time and cost, local stand-alone configuration may prove advantageous, e.g., during down times of the configuration server or other emergency situations.

In accordance with a further embodiment of the invention, the rules of the nominal communication include at least one attribute, where the attribute comprises at least one MAC address, at least one IP address, at least one port, at least one Profinet device name, at least one number of TCP connections and/or at least one number of data packets per time unit.

Therefore, to decide whether an "authorized" or "unauthorized" communication input is incoming upstream of the input interface of a programmable logic controller, the rules of the nominal communication can not only use one attribute, but also a plurality of attributes as the decision criterion. By combining a plurality of decision features, a more precise and quicker decision can be made. The error rate in indentifying an "authorized" or "unauthorized" communication input is significantly reduced. In the case of positive identification that a communication input is not harmful, the combination of a plurality of verified decision features makes the probability higher that the identification is correct and the communication input can therefore be forwarded directly to the input interface of a programmable logic controller without further delay. Communication between the programmable logic controllers of the automation components is therefore less affected.

In the case that, due to a combination of a plurality of verified rule violations, a communication input has been classified as "unauthorized", once again there is a higher probability that the identification is not incorrect. Only such communication inputs identified as "unauthorized" are not forwarded directly to the input interface of a programmable logic controller, but first pass through further filtering stages in the processor device and finally to the gate where they are either blocked or, depending on the results of further checks based on defined rules of the reaction matrix, forwarded to the input interface of the programmable logic controller.

In addition, different types of "unauthorized" communication inputs (e.g., computer viruses, data espionage attempts, data manipulation attempts or mis-addressings) can be advantageously identified by using different kinds of attributes in the rules of the nominal communication. Thus, for example, the checking of the number of TCP connections authorizes whether a communication system overload situation is present. Checking of the IP address, for example, indicates the origin of the communication input. At the same time, the checking mechanism described therefore shows scalability for different security requirements.

In accordance with an embodiment of the invention, the warning is communicated as an email, an SMS, via SNMP and/or by a Web service.

The different ways in which a warning can occurs shows flexibility in the communication of a warning and adaptation to the relevant system landscape. A warning can be redundantly issued in a plurality of forms to increase the degree of information and the number of recipients. The distance from the receiver is irrelevant, as emails, SMS and/or Web services allowing worldwide accessibility can also be used.

In accordance with a further embodiment of the invention, the statistics of all the nominal/actual deviations are available for read-out by central servers.

This can have the advantage that no log files need to be stored locally in the programmable logic controllers. Instead, only the nominal/actual deviations are updated locally in the programmable logic controllers, thereby saving storage space in the programmable logic controllers.

At the same time, the ability of a central server to read out the locally updated statistics enables evaluation to be performed centrally and/or separately from the plant, e.g., on a server specially designed for event and incident management. These central evaluations can in turn also be used for central adaptation of the nominal and reaction matrix.

It is also an object of the invention to provide a computer program product having processor-executable instructions for implementing the above described method in accordance with disclosed embodiments of the invention.

It is also an object of the invention to provide a checking device for checking a communication input of a programmable logic controller.

A further object of the invention is to provide an automation network for controlling and checking a communication of an input interface of a programmable logic controller.

It is also a further object of the invention to provide a configuration server which is designed to configure, control and monitor the checking device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred embodiments of the invention will now be explained in greater detail with reference to the following drawings in which.

DETAILED DESCRIPTION OF THE PREFERRED EMBODIMENTS

Figure 1:
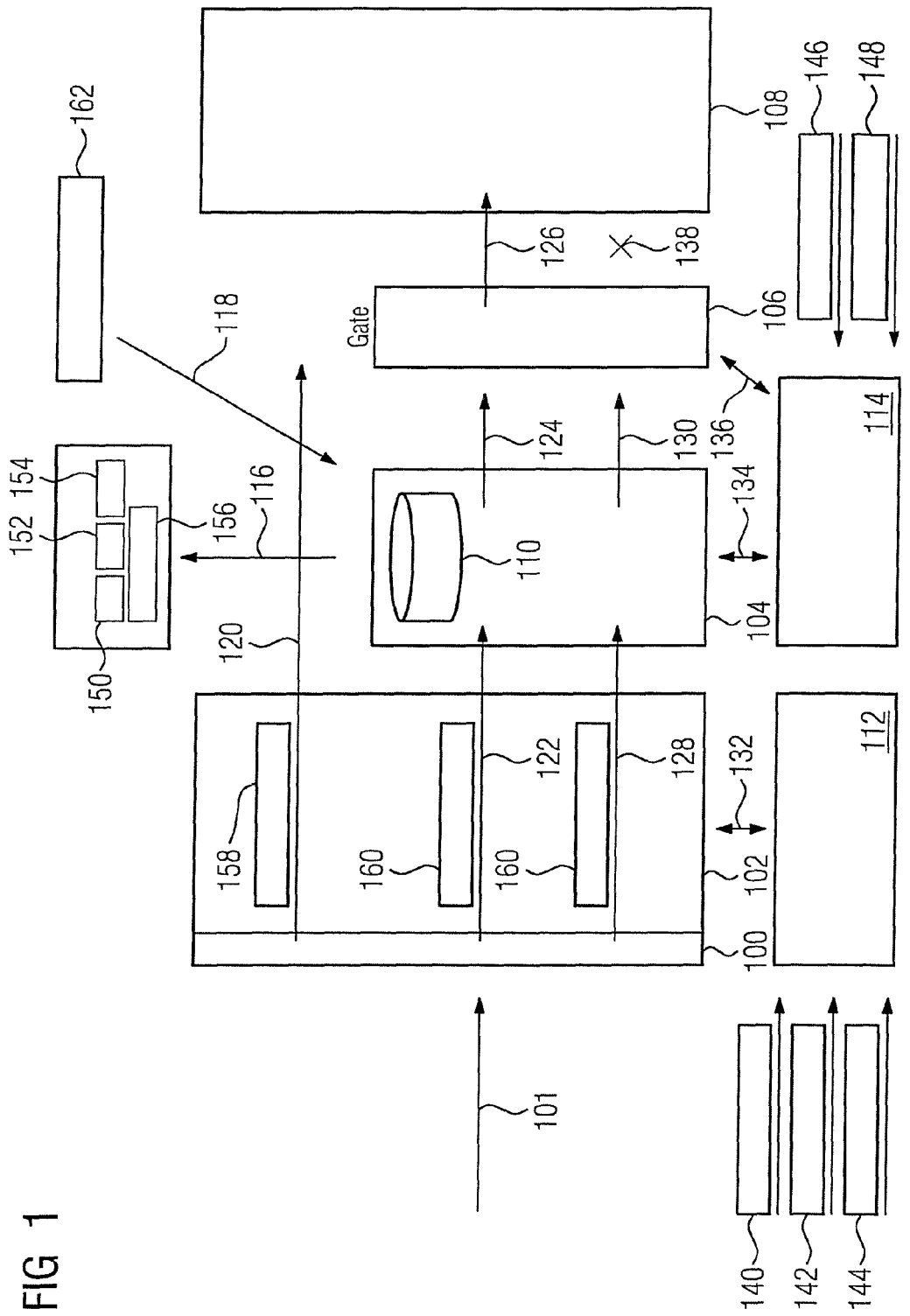
FIG. 1 shows a block diagram of the checking device for checking a communication input of a programmable logic controller in accordance with the invention.

Similar or identical elements of the following embodiments are identified by the same reference characters.

FIG. 1 shows a block diagram of the checking device for checking a communication input of a programmable logic controller. A communication input signal 101, originating from an Ethernet network, Profinet, Profibus or other programming interface, is received by the means for receiving a communication input 100. In the means for performing a nominal/actual comparison 102, a check is performed to determine whether or not the received communication input 101 satisfies at least one rule of the nominal communication 112. If at least one rule of the nominal communication 112 is satisfied, the communication input signal 120 is forwarded directly to the input interface of the programmable logic controller 108.

If the check has revealed that a rule of the nominal communication 112 is not satisfied, the communication input signal 122 or 128 is forwarded to the processor device 104. In the processor device, the statistics 110 of all the nominal/actual deviations, which receive signals from a central server 162 for interrogation and readout 118 and, to determine the updating mode thereof, receive control signals 134 from the reaction matrix 114, are updated.

Depending on predefined reactions in the reaction matrix 114, a warning 116 can be issued as an email 150, SMS 152, via SNMP 154 or a Web service 156.

The communication input signal 124 is forwarded to the gate 106. As further checking in the info-gate 106 based on other rules of the reaction matrix 114 has indicated that no deviation 158 and hence an "authorized" communication input is present, the communication input signal 126 is forwarded directly into the input interface of the programmable logic controller 108.

If further checking in the info-gate 106 based on other rules of the reaction matrix 114 has indicated that a deviation 160 and hence an "unauthorized" communication input is present, the communication input signal 130 is blocked 138.

The reaction matrix 114 sends control signals 134 to the processor device 104 and sends control signals 136 to the gate. The reaction matrix 114 likewise receives checking signals 134 from the processor device 104 and checking signals 136 from the gate 106.

The rules for the nominal communication 112 can be created either by a learning mode 140, a stand-alone configuration 142 or by a configuration server 144.

The reactions for the reaction matrix 114 can be created either as a stand-alone configuration 146 or by a configuration server 148.

Figure 2:
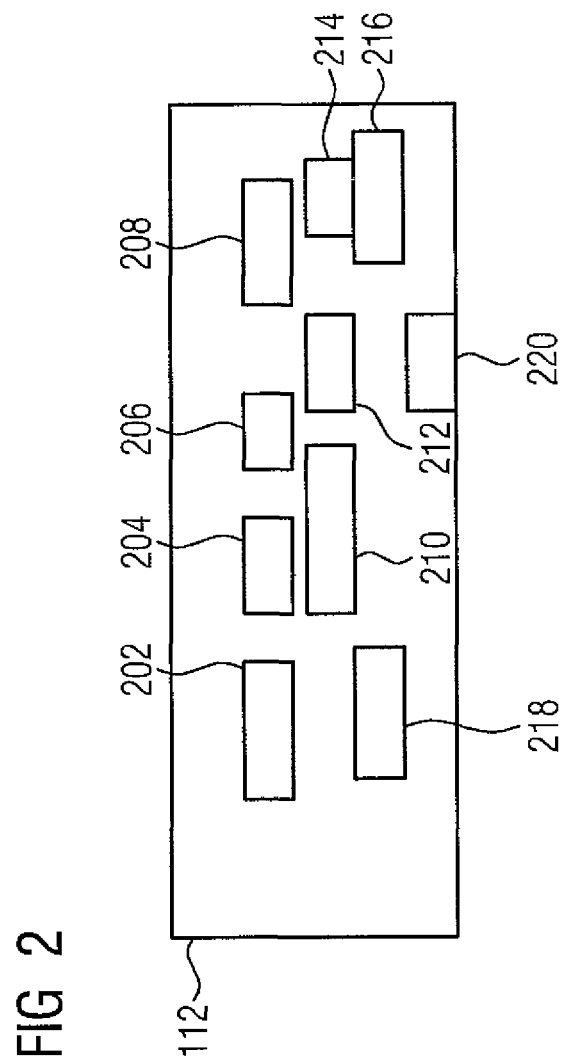
FIG. 2 shows attributes in rules of a nominal communication in accordance with the invention.

FIG. 2 shows an example of a nominal communication 112. Here the MAC address 202, the IP address 204, the port 206 and/or the protocol 208, for example, are used as attributes for defining rules of a nominal communication. The values 144.145.160.* 210 for the IP address, 202, 2000 212 for the port 206, TCP 214 for the protocol 208, PROFIsafe 216 for the protocol 208, 00:0A:BB:* 218 for the MAC address, <1000 220 for the port that are entered in the column correspond to the nominal specifications for the attributes. If the nominal figures are read row-by-row (e.g., 210, 212, 214), it can be seen that an ANDing of at least two attributes for continuity checking of a communication input can also be defined. If a data packet fulfills the conditions of at least one row of the nominal communication matrix 112, the communication input signal 120 is forwarded directly to the input interface of the programmable logic controller 108.

If this is not the case, the communication input signal 12 is forwarded to the processor device 104 where it is further processed according to the predefined reactions 312, 314, 316 of the reaction matrix 114.

Figure 3:
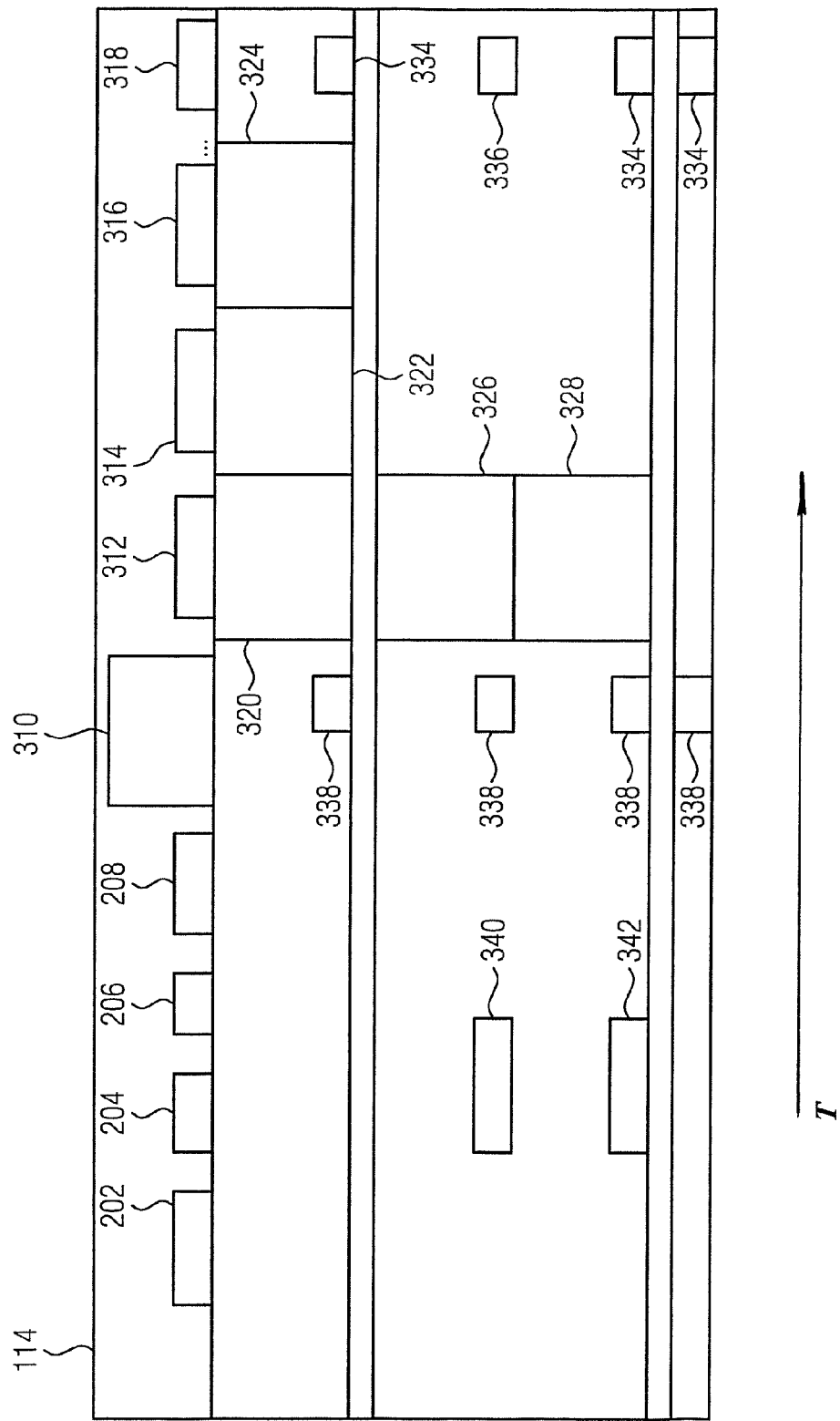
FIG. 3 shows a reaction matrix in accordance with the invention.

FIG. 3 shows an embodiment of a reaction matrix 114 comprising examples 1, 2 and 3, again using a plurality of attributes for defining rules for triggering a reaction, e.g., the MAC address 202, the IP address 204, the port 206 and/or the protocol 208. In the left-hand part (the first four columns) the nominal criteria are specified. Thus, in FIG. 3, in example 1 and 3, no nominal specifications for the attributes of an incoming communication input are set, while in example 2 two different nominal values !=144.145.* 340 and =144.145.* 342 for the attribute IP address 204 of a nominal communication for case differentiation in respect of blocking 336 or not blocking 334 are specified.

In the right-hand part of the reaction matrix 114 (right-hand five columns) the individual reactions 320, 322, 324, 326, 328 to be triggered are entered in the columns "reaction 1" 312, "reaction 2" 314 and "reaction 3" 316.

In example 1, the reaction matrix 114 specifies that, as reaction 1 314, an email 320 shall be sent to a@111 the first time the IP address appears. Simultaneously, as reaction 2 314, an SMS 322 shall be sent to b@111 the first time the IP address appears. As reaction 3 316, an email 324 shall likewise be written to CCC the first time the IP address appears. In example 2, an email 326 or 328 shall be sent to a@111 as reaction 1 both in the event of compliance with the nominal value 340 for the IP address of the communication input and in the event of compliance with the nominal value 342 for the IP address of the communication input.

In the "update deviation statistics" column 310, the nominal values for which updating of the internal statistics 110 of the nominal/actual deviations in the processor device 104 has to occur is defined. In the examples 1, 2 and 3, a command 338 to update deviation statistics 110 is issued in each case.

In the "block" column 318 it is defined when 336 and when not 334 blocking of the communication input 101 in the gate 106 is to occur. In the examples 1 and 3, the reaction matrix 114 orders non-blocking 334 of the communication input signal 126. In example 2, a case distinction is made depending on the nominal values 340 and 342 set in respect of the attribute IP address of the incoming communication input: if the nominal value 340 is satisfied, the reaction matrix 114 orders blocking 336 of the communication input signal 138; if the nominal value 342 is satisfied, the reaction matrix 114 orders non-blocking 334 of the communication input signal 126.

Figure 4:
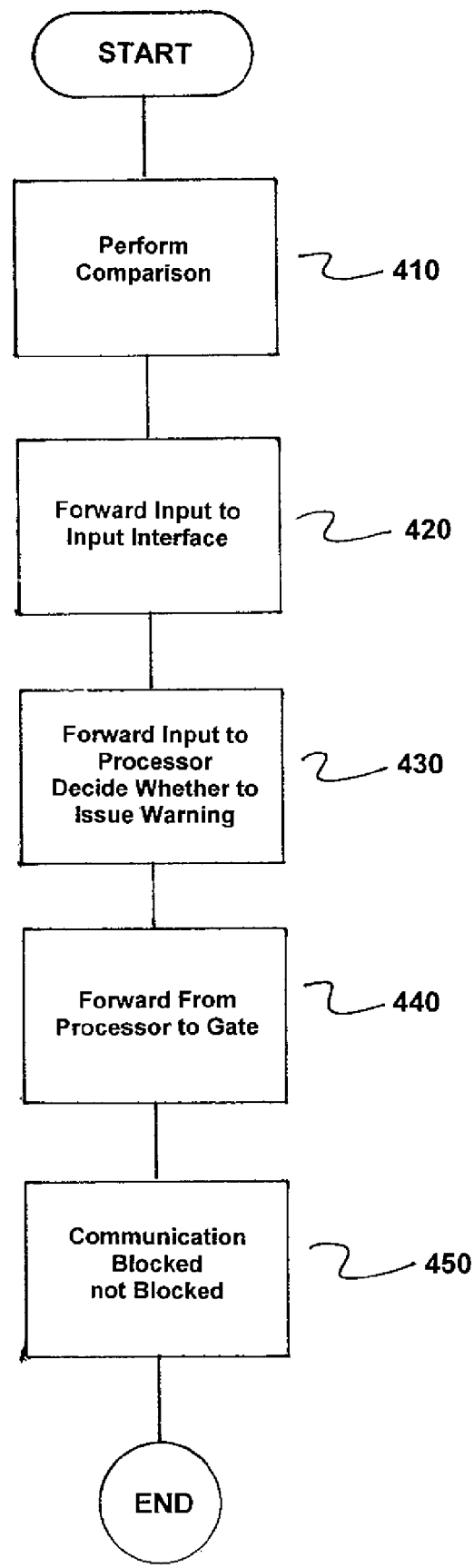
FIG. 4 is a flowchart of the method in accordance with the invention.

FIG. 4 is a flow chart of a computer-implemented method for checking a communication input of a programmable logic controller of an automation component of a plant, where the checking occurs immediately upstream of an input interface of the programmable logic controller. The method comprises performing a nominal/actual comparison between a communication input and predefined rules of a nominal communication, as indicated in step 410.

If the communication input satisfies at least one predefined rule of the nominal communication, then the communication input is forwarded directly to the input interface of the programmable logic controller, as indicated in step 420.

If the communication input does not satisfy the at least one predefined rule, then the communication input is forwarded to a processor, in which internal statistics of all nominal/actual deviations are initially updated, and a decision is made based on a predefined reaction matrix whether a respective communication input shall result in issuance of a predefined active warning, as indicated in step 430.

If the communication input does not satisfy at least one predefined rule, then the processor forwards the communication input to a gate upstream of the input interface of the programmable logic controller, as indicated in step 440.

A determination is then made in the gate whether the communication input is blocked or not blocked depending on the predefined reaction matrix, as indicated in step 450.

Thus, while there have been shown, described and pointed out fundamental novel features of the invention as applied to a preferred embodiment thereof, it will be understood that various omissions and substitutions and changes in the form and details of the methods and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A computer-implemented method for checking a communication input of a programmable logic controller of an automation component of a plant, said checking occurring immediately upstream of an input interface of the programmable logic controller, the method comprising the steps of:
    performing a nominal/actual comparison locally at the programmable logic controller between a communication input and predefined rules of a nominal communication;
    forwarding a communication input directly to the input interface of the programmable logic controller, if the communication input satisfies at least one predefined rule of the nominal communication;
    forwarding the communication input to a processor in which internal statistics of all nominal/actual deviations are initially updated and deciding, based on a predefined reaction matrix including data arranged in rows and columns and including control features for controlling processes in one of the processor and a gate upstream of the input interface, whether a respective communication input shall result in issuance of a predefined active warning, if the communication input does not satisfy the at least one predefined rule;
    forwarding, by the processor, the communication input to the gate upstream of the input interface of the programmable logic controller, if the communication input does not satisfy at least one predefined rule;
    determining in the gate whether the communication input is one of blocked and not blocked depending on the predefined reaction matrix including the data arranged in rows and columns; and
    deciding, based on the control features, whether statistics of all the nominal/actual deviations are to be updated and in which manner the statistics of all the nominal/actual deviations are to be updated.

2. The method as claimed in claim 1, wherein the predefined rules of the nominal communication are created by one of a learning mode in which the programmable logic controller stores a communication input profile when the learning mode is activated, manual configuration and distributing, by a central server, a communication input profile to programmable logic controllers.

3. The method as claimed in claim 1, further comprising the step of:
    deciding, based on the control features at least one of:
    (i) whether to issue a warning comprising an information message;
    (ii) a form of the information message if the warning is to be issued;
    (iii) which information message is to be transmitted;
    (vi) which address the information message is to be sent; and
    (v) whether the communication input is to be one of blocked and not blocked in the gate.

4. The method as claimed in claim 2, further comprising the step of:
    deciding, based on the control features at least one of:
    (i) whether to issue a warning comprising an information message;
    (ii) a form of the information message if the warning is to be issued;
    (iii) which information message is to be transmitted;
    (vi) which address the information message is to be sent; and
    (v) whether the communication input is to be one of blocked and not blocked in the gate.

5. The method as claimed in claim 1, wherein the predefined reaction matrix is at least one of entered directly as a stand-alone configuration during configuration of the programmable logic controller and transmitted as a profile from a centrally configured configuration server.

6. The method as claimed in claim 2, wherein the predefined reaction matrix is at least one of entered directly as a stand-alone configuration during configuration of the programmable logic controller and transmitted as a profile from a centrally configured configuration server.

7. The method as claimed in claim 3, wherein the predefined reaction matrix is at least one of entered directly as a stand-alone configuration during configuration of the programmable logic controller and transmitted as a profile from a centrally configured configuration server.

8. The method as claimed in claim 1, wherein the predefined rules of the nominal communication comprise at least one attribute comprising at least one of at least one MAC address, at least one IP address, at least one port, at least one Profinet equipment name, at least one number of TCP connections and at least one number of data packets per time unit.

9. The method as claimed in claim 1, wherein the warning is communicated as at least one of an email, an SMS, via SNMP and by a Web service.

10. The method as claimed in claim 3, wherein the warning is communicated as at least one of an email, an SMS, via SNMP and by a Web service.

11. The method as claimed in claim 1, wherein the internal statistics of all the nominal/actual deviations are available for readout by central servers.

12. The method as claimed in claim 3, wherein the internal statistics of all the nominal/actual deviations are available for readout by central servers.

13. A non-transitory computer program product having a computer program executing on a processor which, when used on a programmable logic controller, causes the processor to check a communication input of a programmable logic controller of an automation component of a plant, said checking occurring upstream of an input interface of the programmable logic controller, the computer program comprising:

program code for performing locally at the programmable logic controller a nominal/actual comparison between a communication input and predefined rules of a nominal communication;

program code for forwarding a communication input directly to the input interface of the programmable logic controller, if the communication input satisfies at least one predefined rule of the nominal communication;

program code for forwarding the communication input to a processor in which internal statistics of all nominal/actual deviations are initially updated and deciding, based on a predefined reaction matrix including data arranged in rows and columns and including control features for controlling processes in one of the processor and a gate upstream of the input interface, whether a respective communication input shall result in issuance of a predefined active warning, if the communication input does not satisfy the at least one predefined rule;

program code for forwarding, by the processor, the communication input to the gate upstream of the input interface of the programmable logic controller, if the communication input does not satisfy at least one predefined rule;

program code for determining in the gate whether the communication input is one of blocked and not blocked depending on the predefined reaction matrix including the data arranged in rows and columns; and program code for deciding, based on the control features, whether statistics of all the nominal/actual deviations are to be updated and in which manner the statistics of all the nominal/actual deviations are to be updated.

14. A checking device for checking a communication input of a programmable logic controller of an automation component of a plant, wherein components for performing the checking method being connected upstream of an input interface of the programmable logic controller, the checking device comprising:

at least one processor;
memory operatively coupled to the at least one processor; and
at least one gate;
wherein the memory includes instructions which are executed to:
perform locally at the programmable logic controller nominal/actual comparisons between a communication input and predefined rules of a nominal communication;
forward the communication input directly to the input interface of the programmable logic controller if the communication input satisfies at least one predefined rule of the nominal communication;
forward the communication input to the processor, the third module including a module for updating internal statistics of all nominal/actual deviations and a module which applies a predefined reaction matrix including data arranged in rows and columns, and the processor being configured to decide, by applying the predefined reaction matrix including the data arranged in rows and columns and including control features for controlling processes in one of the processor and the gate, whether a respective communication input shall result in issuance of a predefined active warning;
forward the communication input from the processor to the gate upstream of the input interface of the programmable logic controller if the communication input does not satisfy the at least one predefined rule; and
decide, based on the control features, whether statistics of all the nominal/actual deviations are to be updated and in which manner the statistics of all the nominal/actual deviations are to be updated; and
wherein the gate is configured to determine, based on the reaction matrix including the data arranged in rows and columns and including control features for controlling processes in one of the processor and the gate, whether the communication input is blocked.

15. The checking device as claimed in claim 14, wherein the memory includes further instructions which are executed to:

receive the communication input,
implement a learning mode to create the at least one predefined rule for the nominal communication;
cause the reaction matrix to decide what reaction is to be performed, the reaction including at least one of issuing a warning, sending an information message from the at least one processor, forwarding the communication input to the gate, and one of blocking and not blocking the communication input in the gate,
issue the warning;
create and send an information message for at least one of local reporting and central reporting;
forward the communication input from the at least one processor to the gate;
block the communication input;
forward the communication input from the gate to the input interface of the programmable logic controller if the communication input is not blocked in the gate;
receive a communication profile containing the predefined rules of the nominal communication, the communication profile being defined on a central configuration server;
utilize the received communication profile for local nominal/actual comparison between an incoming communication input and the predefined rules of the nominal communication;
receive the reaction matrix administered on the central configuration server;
locally apply the received reaction matrix during evaluation of the incoming communication input;
locally execute predefined reactions derived from the received reaction matrix;
send an information message to a central server; and
provide the central server with locally updated internal statistics of all the nominal/actual deviations.

16. An automation network for controlling and checking a communication of an input interface, the automation network comprising:

at least one programmable logic controller of an automation component of a plant, the at least one programmable logic controller including the input interface;
a central configuration server;
a checking device upstream of the input interface of the at least one individual programmable logic controller, the checking device comprising:
at least one processor;
memory operatively coupled to the at least one processor; and
at least one gate;
wherein the memory includes instructions which are executed to:
perform locally at the programmable logic controller nominal/actual comparisons between a communication input and predefined rules of a nominal communication;
forward the communication input directly to the input interface of the programmable logic controller if the automation component of the plant if the communication input satisfies at least one predefined rule of the nominal communication;

forward the communication input to the processor, the third module including a module for updating internal statistics of all nominal/actual deviations and a module for applying a predefined reaction matrix including data arranged in rows and columns and including control features for controlling processes in one of the processor and the gate, and the at least one processor being configured to decide, by applying the predefined reaction matrix including the data arranged in rows and columns, whether a respective communication input shall result in issuance of a predefined active warning; and forward the communication input from the processor to the gate upstream of the input interface of the programmable logic controller if the automation component of the plant if the communication input does not satisfy the at least one predefined rule, the gate being configured to determine, based on the predefined reaction matrix, whether the communication input is blocked;

decide, based on the control features, whether statistics of all the nominal/actual deviations are to be updated and in which manner the statistics of all the nominal/actual deviations are to be updated; and provide communication between the central configuration server and the checking device.

17. The automation network as claimed in claim 15, wherein the central configuration server is configured to configure, control and monitor the checking device, the central configuration server being further configured to:

define rules of the nominal communication of the checking device;

forward the communication profile containing the predefined rules of the nominal communication to each individual checking device;

administer the predefined reaction matrix including data arranged in rows and columns and including control features for controlling processes in one of the processor and the gate with definition of reactions in response to the communication input passing through at least one of the processor and the gate of the checking device;

at least one of interrogate, read out and evaluate the statistics of all the nominal/actual deviations updated internally in the at least one processor of the checking device; and receive warnings issued by the at least one processor of the checking device.

18. The automation network as claimed in claim 16, wherein the configuration server is configured to configure, control and monitor the checking device, the configuration server being further configured to:

define rules of the nominal communication of the checking device;

forward the communication profile containing the predefined rules of the nominal communication to each individual checking device;

administer the predefined reaction matrix including the data arranged in rows and columns with definition of reactions in response to the communication input passing through at least one of the processor and the gate of the checking device;

at least one of interrogate, read out and evaluate the statistics of all the nominal/actual deviations updated internally in the at least one processor of the checking device;

receive warnings issued by the at least one processor of the checking device.

* * * * *